Aug. 16, 1949.  J. A. BAUR  2,479,055
FISHING ROD HOLDER
Filed May 12, 1948
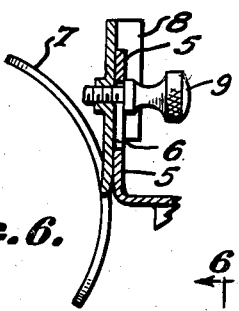
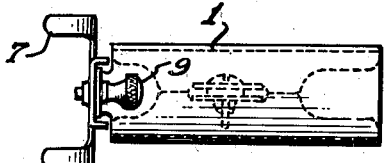
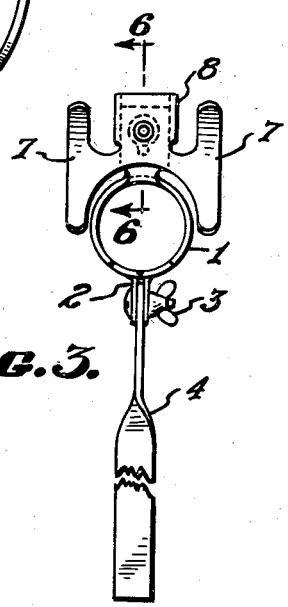
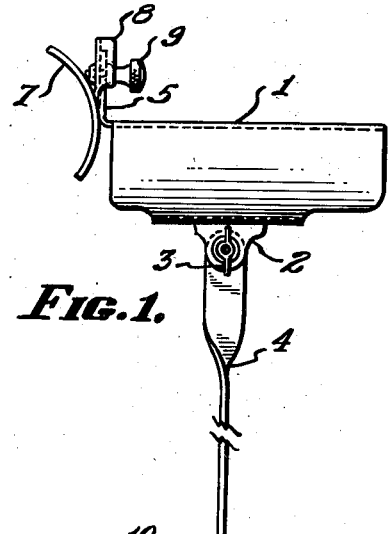
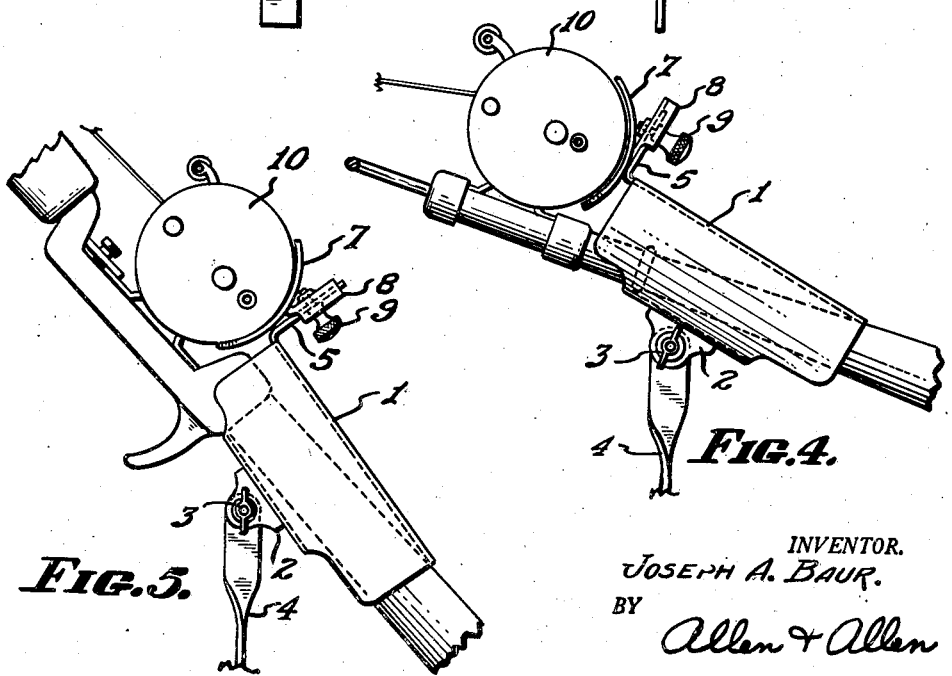
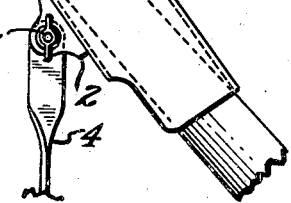
INVENTOR.
JOSEPH A. BAUR.
BY
Allen & Allen
ATTORNEYS.

Patented Aug. 16, 1949

2,479,055

UNITED STATES PATENT OFFICE 2,479,055

FISHING ROD HOLDER

Joseph A. Baur, North College Hill, Ohio

Application May 12, 1948, Serial No. 26,627

4 Claims. (Cl. 43—4)

My invention relates to a fishing rod holder for holding the fishing rod while fishing, thus permitting the fisherman to set out a number of rods at one time without the necessity of holding them in his hands.

Fishing rod holders of this type are provided with a vertical strap shaped support which may be inserted in the bank of a stream or may be clamped to the side of a boat and which carry the rod holder itself.

It is usually a problem to maintain the rod in its upright position with the reel at the top and to so hold the same that the rod and reel may be quickly and easily removed from the holder when a fish is hooked to the end of the line.

There are numerous different types of fishing rod handles wherein the reel is mounted either slightly below the center line of the rod or in some cases above the center line.

It is an object of my invention to provide a fishing rod holder which holds the handle of the rod and which has a reel embracing and abutting means to maintain the reel in a position above the rod. The reel abutting means is adjustable in reference to the rod holding portion so that it will accommodate a reel placed on either an offset rod handle or a straight rod handle.

It is a further object of my invention to provide a fishing rod holder which will quickly accommodate a fishing rod and from which the rod may be easily and quickly removed.

It is a further object of my invention to provide a fishing rod holder having all of the above advantages, but which may be easily folded up and placed in a tackle box for transportation.

It is a further object of my invention to provide a fishing rod holder having all of the above advantages which is neat in appearance, may be easily cleaned, and may be inexpensively manufactured and sold.

While in the description and drawings which follow I have shown the strap shaped vertical support with a portion broken away, it is to be understood that this support may be of any convenient length with or without a point on the end or may be of the type which will permit it to be clamped on the gunwale of a boat.

These and other objects of my invention which will be set forth hereinafter or will be apparent to one skilled in the art upon reading these specifications, I accomplish by that certain construction and arrangement of parts of which I shall now describe an exemplary embodiment.

Reference is now made to the drawings which form a part thereof, and in which:

Figure 1 is a side elevation of my novel fishing rod holder.

Figure 2 is a plan view of my novel fishing rod holder.

Figure 3 is an end elevation of my fishing rod holder.

Figure 4 is a side elevation of my fishing rod holder carrying a fishing rod of the straight type and a reel.

Figure 5 is a side elevation of my fishing rod holder in operation and carrying a fishing rod having an offset reel carrying portion and the reel.

Briefly, in the practice of my invention, I provide a cylindrical rod embracing portion mounted by means of a bolt and wing nut on one end of a vertical support so it may be adjusted as to angle. The rod is slipped into the cylindrical portion which at one end has an upstanding ear carrying a slot. Mounted on the upstanding ear is the reel abutting portion which consists of two curved ears which partially embrace the periphery of the reel. This portion is fastened to the ear of the cylindrical portion by means of a thumb screw sliding through the slot, thus permitting radial adjustment of the position of the reel abutting portion with respect to the cylindrical portion to accommodate different positions of reels.

Referring to the drawings, I provide a hollow cylindrical handle embracing portion 1 having projecting lugs 2, carrying a bolt and wing nut 3 passing through the end of the vertical support 4.

Projecting upwardly and radially from the cylindrical portion 1 is a lug 5 having a radially disposed slot 6.

The reel abutting portion comprises an integral member having two curved portions 7 and the channel shaped lug 8. Screwed into the lug 8 is a thumb screw 9, which passes through the slot 6.

When the rod holder is being used with a straight type rod as shown in Figure 4, the reel contacting portion 7 is moved away from the rod embracing portion 1 by manipulating the thumb screw 9 so the channel lug 8 may be moved on the lug 5.

When the rod holder is being used with an offset type of rod as shown in Figure 5, the reel abutting portion 7 is moved inwardly toward the handle embracing portion 1, so that the abutments 7 will snugly conform to the periphery of the reel 10. The adjustment, of course, may be changed for each different size of reel or type of reel mounting.

From the above, it is apparent that I have provided a fishing rod holder into which a fishing rod may be quickly slipped and removed therefrom and which has a device which maintains the reel on the upper side of the rod and which may be adjusted to accommodate different types of reels and rods. The fishing rod holder is preferably formed of sheet metal and is relatively inexpensive to manufacture and sell.

It is to be understood that modification may be made in my invention without departing from the spirit thereof, and I do not intend to limit myself otherwise than as pointed out in the claims which follow. Having thus described my invention, what I claim as new and desire to secure by Letters Patent is:

1. A fishing rod holder comprising a cylindrical rod embracing portion mounted on a vertical support and an abutment mounted on one end of said cylindrical portion adapted to embrace a portion of a fishing reel attached to the embraced rod, said abutment being adjustable radially of said cylindrical portion.

2. A fishing rod holder comprising a cylindrical rod embracing portion mounted on a vertical support and an abutment mounted on one end of said cylindrical portion adapted to embrace a portion of a fishing reel attached to the embraced rod, said abutment being adjustable radially of said cylindrical portion, the mounting joining the cylindrical portion and the support being adjustable as to relative angularity.

3. A fishing rod holder comprising a cylindrical rod embracing portion mounted on a vertical support and an abutment mounted on one end of said cylindrical portion adapted to embrace a portion of a fishing reel attached to the embraced rod, said abutment being adjustable radially of said cylindrical portion, said abutment comprising two curved ears adapted to partially embrace the periphery of the reel.

4. A fishing rod holder comprising a metal tubular portion adapted to retain the handle of a fishing rod, a projecting lug on the tubular portion pivotally attached to one end of a strap shaped support, a lug having a bend and radially disposed on one end of the tubular portion, having a slot therein, a reel abutment comprising two curved reel contacting ears integral with a channel shaped lug embracing the lug on the tubular portion and a thumb screw carried by said channel shaped lug and passing through the radial slot of the lug on the tubular portion so that the radial distance between the tubular portion and the reel abutment may be varied.

JOSEPH A. BAUR.

REFERENCES CITED

The following references are of record in the file of this patent:

UNITED STATES PATENTS

| Number | Name | Date |
| --- | --- | --- |
| 1,192,112 | Porter | July 25, 1916 |
| 1,275,928 | Huppertz | Aug. 13, 1918 |
| 2,249,302 | Smith | July 15, 1941 |